June 4, 1963

B. W. LEAKE ETAL 3,092,790

DIRECTIONAL FILTERS

Filed May 12, 1960

INVENTORS
BERNARD W. LEAKE
DONALD A. MACDONALD
BY Joseph D. Pannone
ATTORNEY

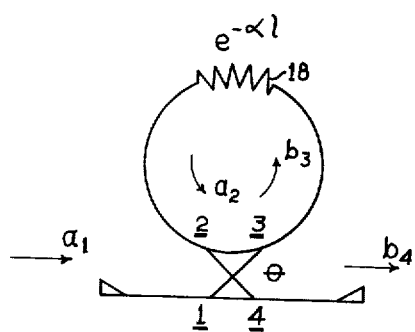
FIG. 2
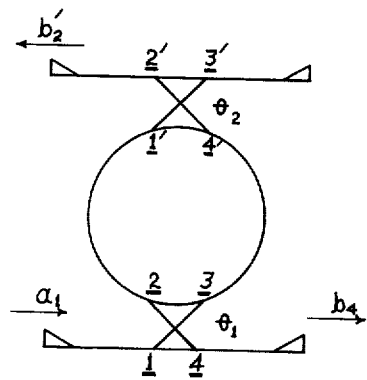
FIG. 3
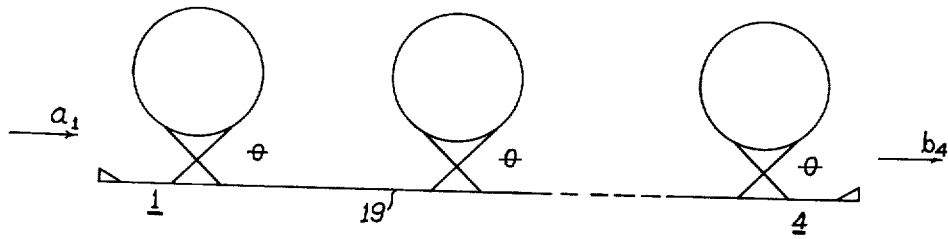
FIG. 4
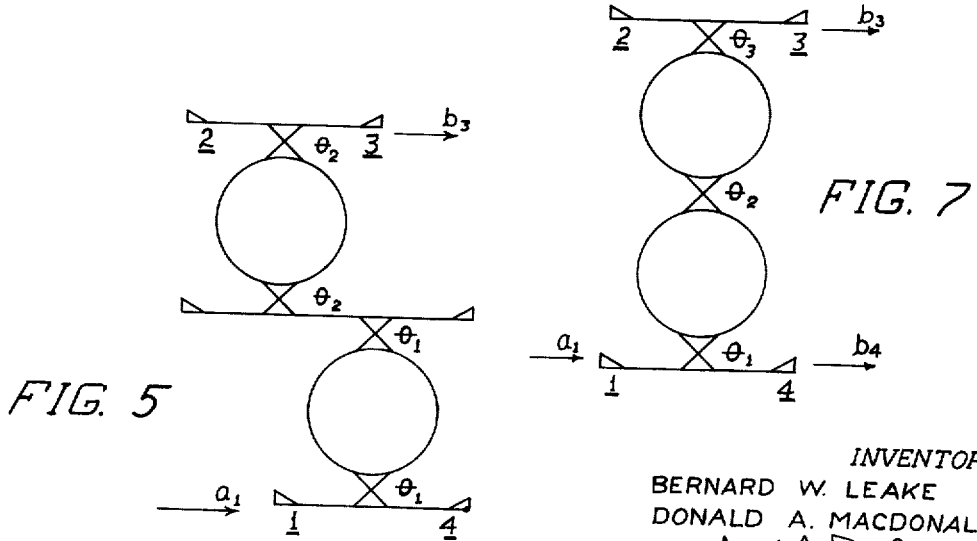
FIG. 5
FIG. 7

INVENTORS
BERNARD W. LEAKE
DONALD A. MACDONALD
BY Joseph D. Pannone
ATTORNEY

United States Patent Office 3,092,790
Patented June 4, 1963

3,092,790
DIRECTIONAL FILTERS
Bernard W. Leake, Framingham, and Donald A. Macdonald, Natick, Mass., assignors to Raytheon Company, Lexington, Mass., a corporation of Delaware
Filed May 12, 1960, Ser. No. 28,787
7 Claims. (Cl. 333—10)

This invention relates to directional filters, and more particularly, to a novel structure combining the properties of a directional coupler and a loop filter for separating, for example, harmonic signals from a fundamental signal in a main transmission line while at the same time causing no attenuation of said fundamental signal in the line.

Directional couplers have been employed extensively for routing part of a signal from a transmission line, which may be, for example, a waveguide to a cavity wherein a measure of the energy content or frequency of the transmission line signal may be made by a probe. Directional couplers are also employed to route a fraction of reflected signals in a waveguide to a load outside of the waveguide wherein the reflected signals are absorbed.

Generally, directional couplers consist simply of a four arm junction in which it is possible to group the four arms into first and second pairs of arms such that members of each pair are decoupled from each other, and both members of said first pair are reciprocally coupled to both members of said second pair. For the abovementioned applications of directional couplers, adjacent coupled arms of different pairs are usually formed by a transmission line conducting a signal for some useful purpose, while the remaining two adjacent coupled arms are employed to sample a portion of the signal from the transmission line in an auxiliary line. In most applications it is desirable that the latter two adjacent coupled arms feed into matched loads so that no signals feed thereto are reflected back into the transmission line.

It has been proposed, in the past, to combine the properties of a directional coupler and a transmission line loop to produce a "directional filter." Such a scheme is described, for example, in an article by Cohn and Coale in the August, 1956 issue of Proceedings of the IRE. In that article there is described a system employing, for example, microstrip conductors, whereby a desired band of a range of frequencies entering a first arm of the system will be transferred to a second arm with little insertion loss and will be considerably attenuated (15 to 20 db) in a third arm. Over the frequency range for which the directional coupler is designed the fourth arm is, for most practical purposes, isolated and the first arm is non-reflecting. Consequently, the system acts as a "directional filter" passing the desired band of frequencies to the second arm and attenuating it in the third arm so the desired band is isolated from the remaining frequencies of the range. Such directional filter systems depend for frequency selection upon the change of electrical length with frequency of the loop of auxiliary line connecting two coupled arms of the directional coupler. The frequency sensitivity or "Q" of such a filter depends largely on the degree of coupling of the directional coupler. The coupling structure suggested in the referenced article exhibits little frequency dependence; thus the filter provides similar stop and pass bands at essentially regularly spaced frequency intervals. The loss introduced in a main transmission line by the insertion of such a filter has a minimum value at frequencies for which the loop length is an odd number of half-wavelengths. The loss in the transmission line can never be zero, and depends on the coupling factor of the directional coupler, which also effects the filter Q. Thus, for a required value of Q, the insertion loss is determined.

In the referenced article, the maximum attenuation in the main transmission line occurs at frequencies for which the loop length is an integral number of wavelengths and can be made very high (over 20 db).

Therefore, it is one object of the present invention to provide a directional filter, the insertion loss of which when introduced into the main transmission line is essentially the same for all frequencies propagated by the main line below some chosen frequency, while still providing very high attenuation in certain frequency bands above the chosen frequency.

It is another object of the present invention to provide a directional filter employing waveguides whereby the sharp cut off characteristics typical of a waveguide contribute to the filtering or frequency isolation.

It is another object of the present invention to provide a filter for removing second harmonics of a fundamental frequency in a transmission line without attenuating said fundamental frequency therein.

It is another object to provide a directional coupler for coupling harmonic signals from a main transmission line to an auxiliary line, the coupling between the main and auxiliary lines being cut off to the fundamental of said harmonic signals.

It is another object to provide a directional filter whereby certain frequencies in a transmission line may be coupled therefrom so that insertion loss in the transmission line with regard to said frequencies will exceed 20 db.

Various embodiments of the present invention provide a directional filter including a main transmission line and an auxiliary line directional coupler coupled to the main and auxiliary lines exhibiting cut off at different frequencies, and at least one transmission line loop connected to the auxiliary line, adjacent uncoupled arms of said directional coupler being designed for cut off at different frequencies so that harmonics of said fundamental frequency are coupled from the main transmission line to the loop and cancelled in the line but the fundamental frequency is not.

The present invention employs, for example, a loop waveguide coupled to a main transmission line by a directional coupler, the loop waveguide being designed to be cut off to the fundamental frequency in the transmission line but not cut off to harmonic frequencies, the length of the loop being such that harmonic frequencies are coupled back into the transmission line in phase opposition to harmonic frequencies conducted therein.

Some embodiments of the present invention are loops cascaded together with directional couplers some of which are cut off to different frequencies to thereby obtain modified directional filtering actions.

Other features and objects of the present invention will be more apparent from the following specific description taken in conjunction with the drawings in which:

FIG. 2 illustrates a directional filter employing a single loop having a given internal load;

FIG. 3 illustrates a directional filter employing two couplers and is equivalent to the system of FIG. 2, but with the load externally connected to arm 2';

FIGS. 4 and 5 illustrate cascaded directional filters which are similar to each other in some respects;

FIG. 7 illustrates a two loop directional filter having loops coupled by a single directional coupler;

Figure 1A:
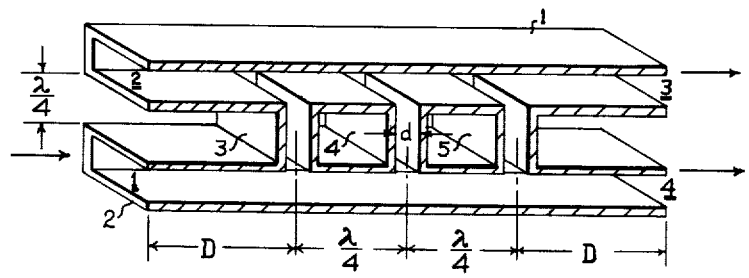
FIGS. 1a, 1b, 1c and 1d illustrate typical directional couplers employed in the past having all arms designed for cut off at substantially the same frequency.
Figure 1B:
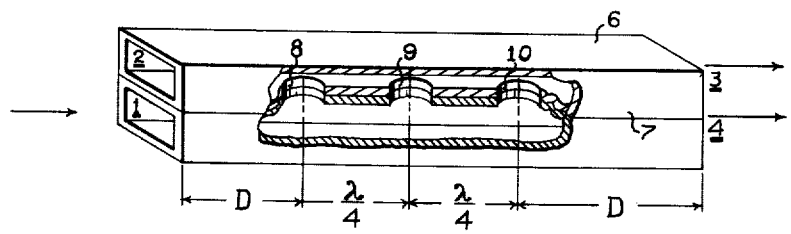
Figure 1C:
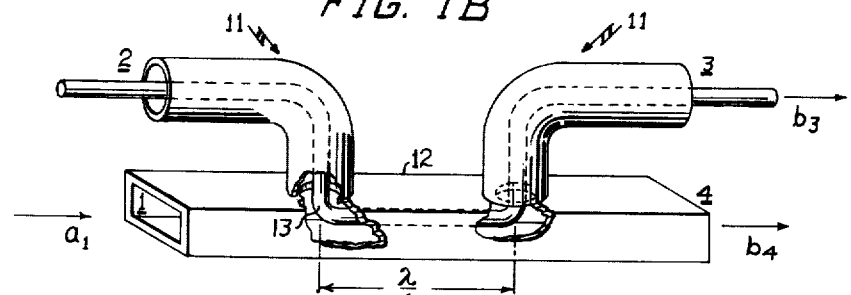
Figure 1D:
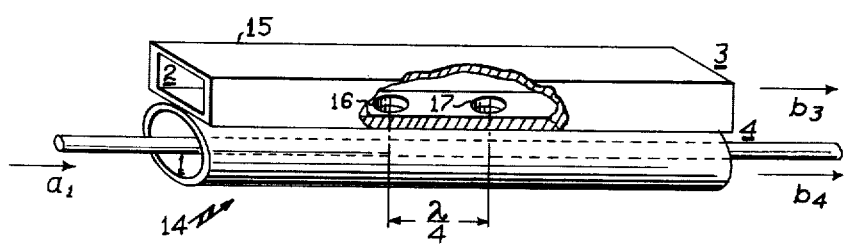

Turning first to FIGS. 1a, 1b, 1c and 1d, there are shown typical directional couplers employed in the past. In FIG. 1a the directional coupler includes two waveguides 1 and 2 coupled together by three one-quarter wavelength guides 3, 4 and 5 at points which are separated by preferably one-quarter wavelength. In FIG. 1b there is shown another directional coupler structurally different but operationally equivalent to the coupler in FIG. 1a, including two waveguides 6 and 7 coupled together by openings 8, 9, and 10 disposed one-quarter wavelength apart as shown. FIG. 1c shows a directional coupler formed by a coaxial transmission line 11 and a waveguide 12, the center conductor 13 of the coaxial line being coupled into the guide at points approximately one-quarter wavelength apart. The coupler in FIG. 1d is similar to the one in FIG. 1c including a coaxial line 14 and waveguide 15; however, coupling is through openings 16 and 17 therebetween.

In couplers shown in FIGS. 1c and 1d, adjacent uncoupled arms are cut off at different frequencies but not in the couplers shown in FIGS. 1a and 1b.

Figure 1E:
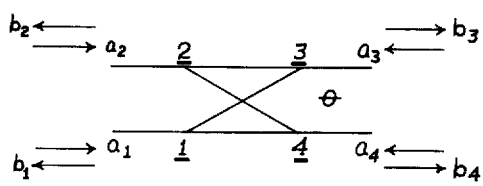
FIG. 1e illustrates a symbolic representation of such directional couplers to aid in understanding the theory of operation.

In FIG. 1e there is shown a symbolic representation of such directional couplers including arms 1, 2, 3 and 4 which represent interfaces 1, 2, 3 and 4 in the directional couplers shown in FIGS. 1a, 1b, 1c and 1d. The amplitudes of waves in each of the arms are denoted as $a$ and $b$, where wave $a$ moves into the coupler and wave $b$ moves away from the coupler, thus $a_1$ and $b_1$ represent the amplitudes of waves in arm 1. If $S_{ij}$ represents the reciprocal amplitude coupling factor between arms $i$, $j$, so that, for example, the coupling between arms 1 and 2 is represented as $S_{12}$, the matrix equation describing the behavior of a directional coupler shown symbolically in FIG. 1c is as follows:

$$(1) \quad \begin{vmatrix} b_1 \\ b_2 \\ b_3 \\ b_4 \end{vmatrix} = \begin{vmatrix} 0 & 0 & S_{31} & S_{41} \\ 0 & 0 & S_{32} & S_{42} \\ S_{31} & S_{32} & 0 & 0 \\ S_{41} & S_{42} & 0 & 0 \end{vmatrix} \begin{vmatrix} a_1 \\ a_2 \\ a_3 \\ a_4 \end{vmatrix}$$

Equation 1 describes amplitude coupling in a directional coupler in which arms 1 and 2 are decoupled and arms 3 and 4 are decoupled. The amplitude coupling coefficient between arms 1 and 4, and between arms 2 and 3, denoted above as $S_{41}$ and $S_{32}$, respectively, are equal, and may be written as $\cos \theta$, then the coupling coefficient between arms 1 and 3 and between arms 2 and 4, denoted above as $S_{31}$ and $S_{42}$, are expressed as $-j \sin \theta$. This indicates that the two coupling coefficients are in quadrature for suitable choice of reference planes.

The parameter $\theta$, is determined by the structure itself and depends on the size, shape, location, and number of holes such as shown in FIGS. 1a and 1d, or the dimension $d$ and number of the coupling waveguide sections shown in FIG. 1a. When, for example, the dimension $d$ is very small, $\theta$ approaches zero. However, for purposes of the present description, assume that $\theta$ is between zero and 90 degrees as established by the dimensions of the structure.

If the arms 2 and 3 are connected to a transmission line loop having a propagation constant $\gamma$ and length $l$, then the wave amplitude $a_2$ is expressed as follows:

$$(2) \quad a_2 = b_3 e^{-\gamma l}$$

The propagation constant $\gamma$ is a complex quantity and may be defined in terms of its real and imaginary parts as follows:

$$(3) \quad \gamma = \alpha + j\beta$$

Referring next to FIG. 2 there is shown a directional coupler having its arms 2 and 3 joined by a transmission line of length $l$, and propagation constant $\gamma$ represented by impedance 18. If arms 1 and 4 look outward into matched impedances, denoted by the wedge, then $b_1$ and $a_4$ are zero and, it follows, that $b_2$ and $a_3$ zero. If the coupling parameter of the coupler shown in FIG. 2 is denoted $\theta$, then the amplitude coupling coefficient between arms 1 and 4 and between arms 2 and 3 is $\cos \theta$ and the coupling coefficient between arms 1 and 3 and between 2 and 4 is $-j \sin \theta$ for a suitable choice of reference planes. With the above being understood, it follows that the matrix equation representing amplitude coupling between arms of a ssytem such as shown in FIG. 2 for an amplitude input, $a_1$, is as follows:

$$(4) \quad \begin{vmatrix} 0 \\ 0 \\ b_3 \\ b_4 \end{vmatrix} = \begin{vmatrix} 0 & 0 & -J\sin\theta & \cos\theta \\ 0 & 0 & \cos\theta & -J\sin\theta \\ -J\sin\theta & \cos\theta & 0 & 0 \\ \cos\theta & -J\sin\theta & 0 & 0 \end{vmatrix} \begin{vmatrix} a_1 \\ b_3 e^{-\gamma l} \\ 0 \\ 0 \end{vmatrix}$$

Equation 4 may be solved to yield the following expressions for $b_3$ and $b_4$.

$$(5) \quad \frac{b_3}{a_1} = -\frac{J \sin \theta}{1 - e^{-\gamma l} \cos \theta}$$

$$(6) \quad \frac{b_4}{a_1} = \frac{\cos \theta - e^{-\gamma l}}{1 - e^{-\gamma l} \cos \theta}$$

When operating the system in FIG. 2 as a filter, it is desirable that one frequency signal input $a_1$ be completely cancelled so that $b_4$, for this frequency, is zero. From Equation 6, $b_4$ is zero when:

$$(7) \quad \cos \theta = e^{-\gamma l} \text{ or } \cos \theta = e^{-\alpha l}[\cos\beta l - l\sin\beta l]$$

Since $\cos \theta$ is a real value, Equation 7 can only be true when $\beta l$ equals $2 N\pi$, where N is an integer, and:

$$(8) \quad \cos \theta = e^{-\alpha l}$$

When the above conditions are true, namely when $\beta l = 2 N\pi$ at a given frequency; and when $\cos \theta$ equals $e^{-\alpha l}$, then the amplitude transmission coefficient or coupling coefficient of the loop transmission line joining 2 and 3 must be $e^{-\alpha l}$ and is represented in FIG. 2 by a lumped impedance 18.

The lumped impedance 18 of FIG. 2 must necessarily introduce no reflection, and reduce the input amplitude by a factor $e^{-\alpha l}$ at the output. These properties can be exhibited by, for example, a suitable section of lossy line, or alternatively by some device which in itself has no loss, but reduces the input amplitude by the required factor, by virtue of the fact that it couples power out of the ring into an external load. One device falling into the latter category is a directional coupler with coupling parameter $\theta_2$ connected as shown in FIG. 3. To satisfy the loss requirement, it is necessary to satisfy the equation:

$$\text{Cos } \theta_2 = e^{-\alpha l}$$

But it has already been shown that in the circuit of FIG. 2, the condition necessary to make $b_4=0$ is:

$$\text{Cos } \theta_1 = e^{-\alpha l}$$

Therefore in order to make the circuits of FIGS. 2 and 3 equivalent, the couplers of FIG. 3 must have the same coupling parameter, $\theta_1 = \theta_2$ and may be identical, provided the connecting transmission line is loss free, and $\alpha = j\beta$ and arms $\underline{2}'$ and $\underline{3}'$ of coupler $\theta_2$ look out to matched impedances.

Referring again to FIG. 3, in the general case where $\theta_1$ and $\theta_2$ are not equal, it can be shown by a rigid analysis that the amplitude ratio between an output $b_4$ and the input $a_1$ and an output $b_2$ and an input $a_1$ are expressed by the following equations:

(9) $$\frac{b_4}{a_1} = \frac{\text{Cos } \theta_1 - e^{-\gamma l} \text{Cos } \theta_2}{1 - e^{-\gamma l} \text{Cos } \theta_1 \text{Cos } \theta_2}$$

(10) $$\frac{b'_2}{a_1} = -\frac{e^{-\frac{\gamma l}{2}} \text{Sin } \theta_1 \text{Sin } \theta_2}{1 - e^{\gamma l} \text{Cos } \theta_1 \text{Cos } \theta_2}$$

It can be shown that Equation 9 reduces to the form of Equation 5 when $\theta_2 = \theta_1 = \theta$ and when $\gamma = j\beta$.

In a practical filter, the transmission line loss will not be zero, so it is necessary in order to make $b_4 = 0$, to satisfy the general equation $$\text{Cos } \theta_1 = e^{-\alpha l} \text{Cos } \theta_2$$

which requires that $$\text{Cos } \theta_1 = e^{-\alpha l} \text{Cos } \theta_2$$

and $$l = 2 N\pi$$

This can always be done for normal values of $\alpha$.
Referring again to FIG. 2 and assuming that $$\text{Cos } \theta = e^{-\alpha l}$$

the power ratio between signals in arms $\underline{1}$ and $\underline{4}$ is represented as follows:

(11) $$\left|\frac{b_4}{a_1}\right|^2 = \left[\frac{e^{-\alpha l} - e^{-\gamma l}}{1 - e^{-\alpha l} e^{-\gamma l}}\right]^2$$

For simplification let $e^{-\alpha l} = K$ and $\beta l = \phi$, then Equation 11 may be expressed as follows:

(12) $$\left|\frac{b_4}{a_1}\right|^2 = \left[1 + \frac{(1-K^2)^2}{2K^2(1-\text{Cos } \phi)}\right]^{-1}$$

Obviously $\phi$, is the electrical length in radians of the waveguide loop at any particular frequency; for example, at frequency $f$. Therefore, if $m$ units such as shown in FIG. 2 are cascaded in the manner shown in FIG. 4, it can be shown that at a frequency $f_B$ where:

(13) $$20 \log \left|\frac{b_4}{a_1}\right| = 3^{db}$$

for which $\phi$ is equal to $\phi_B$, the following equation for $\phi_B$ in terms of K and $m$ can be derived:

(14) $$\tan \frac{\phi_B}{2} = \frac{1-K^2}{1+K^2} \left(\frac{1}{2^{1/m}-1}\right)^{1/2}$$

The frequency $f_B$ is the frequency at which insertion loss from arm $\underline{1}$ to any given one of the other arms, for example, arm $\underline{4}$, is three decibels.

FIG. 4 shows a plurality of $m$ loops coupled to a matched transmission line $\underline{19}$. If the coupling factor Cos $\theta$ for each of the $m$ directional couplers shown in FIG. 4 is approximately unity and, thus, K is approximately unity, Equation 14 reduces to the following:

(15) $$\tan \frac{\phi_B}{2} = \frac{1-K^2}{2(2^{1/m}-1)^{1/2}}$$

and where $\phi_B$ is small, it can be assumed that:

(16) $$\tan \frac{\phi_B}{2} = \frac{1}{2} \tan \phi_B$$

Therefore, at the loop resonant frequency $f_0$, where $\phi = \phi_0 = 2 N\pi$, it is apparent that $\tan \phi_B = \phi_0 - \phi_B$. Furthermore, remembering that $1 - \text{Cos}^2\theta = Sm^2\theta = 1 - K^2$, then Equation 15 reduces to the following:

(17) $$\phi_0 - \phi_B = \frac{\text{Sin}^2 \theta}{(2^{1/m}-1)^{1/2}}$$

Equation 17 may be solved for $\sin^2\theta$, which is equivalent to $1 - K^2$, and the resulting expression substituted in Equation 12 to yield the following expression for power coupling between arms $\underline{1}$ and $\underline{4}$ of transmission line $\underline{19}$.

(18) $$\left|\frac{b_4}{a_1}\right|^2 = \left[1 + \frac{(\phi_0 - \phi_B)^2}{2(1 - \text{Cos } \phi)}(2^{1/m} - 1)\right]^{-m}$$

Now since $1 - \text{Cos } \phi = 2 \text{Sin}^2 \phi/2$ and since $Sm^\phi/2$ is small, it can be assumed, as a close approximation, that $$Sm^\phi/2 = \frac{1}{2}(\phi_0 - \phi)$$

and consequently, it can be assumed as a close approximation that:

(19) $$2(1 - \text{Cos } \phi) = (\phi_0 - \phi)^2$$

Substituting Equation 19 in Equation 18, the following expression for power coupling between arms $\underline{1}$ and $\underline{4}$ of a system such as shown in FIG. 4 consisting of $m$ waveguide loops is obtained:

(20) $$\left|\frac{b_4}{a_1}\right|^2 = \left[1 + \left(\frac{\phi_0 - \phi_B}{\phi_0 - \phi}\right)^2 (2^{1/m} - 1)\right]^{-m}$$

It can be shown that a cascaded system such as shown in FIG. 5 is equivalent in some respects to the system shown in FIG. 4. Consequently, an equation of substantially the same form as Equation 20, will express the power coupling between arms $\underline{1}$ and $\underline{3}$ of the system shown in FIG. 5. A rigid analysis of the cascaded system such as shown in FIG. 5 consisting of $m$ cascaded loops reveals that power coupling from arm $\underline{1}$ to arm $\underline{3}$ denoted, $|b_3/a_1|^2$, is as follows:

(21) $$\left|\frac{b_3}{a_1}\right|^2 = \left[1 + \left(\frac{\phi_0 - \phi}{\phi_0 - \phi_B}\right)^2 (2^{1/m} - 1)\right]^{-m}$$

Obviously, Equations 20 and 21 are equivalent, except the function of $\phi$ in Equation 20 is the reciprocal of a similar function in Equation 21. This function for convenience may be represented by $n_{20}$ in Equation 20 so that:

(22) $$n_{20} = \frac{\phi_0 - \phi_B}{\phi_0 - \phi}$$

and by $n_{21}$ in Equation 21 so that:

(23) $$n_{21} = \frac{\phi_0 - \phi}{\phi_0 - \phi_B}$$

It can be shown that $\phi_0 - \phi_B$ is approximately proportional to one half the 3 db bandwidth $\Delta f_B$ which is centered at $f_0$ and that $\phi_0 - \phi$ is approximately proportional to one half any other bandwidth wider than the 3 db bandwidth, for example, $\Delta f$, also centered at $f_0$. Furthermore, the constants of proportionality are equal. Therefore it follows that bandwidth ratios are equivalent to the phase functions as follows:

(24) $$n_{20} = \frac{\phi_0 - \phi_B}{\phi_0 - \phi} = \frac{\Delta f_B}{\Delta f}$$

and

(25) $$n_{21} = \frac{\phi_0 - \phi}{\phi_0 - \phi_B} = \frac{\Delta f}{\Delta f_B}$$

Figure 6:
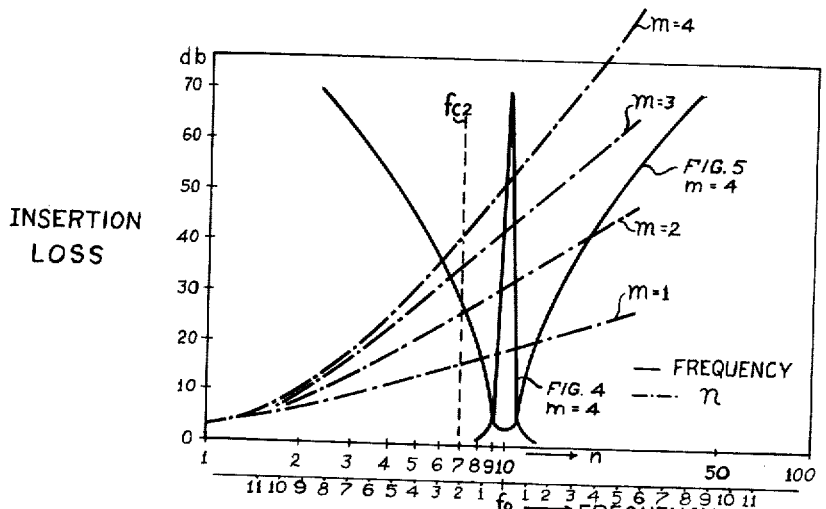
FIG. 6 illustrates a family of curves representing insertion loss versus a function of loop phase, each curve for a different number of loops cascaded in the manners shown in FIGS. 4 and 5.

In FIG. 6 there is shown a semi-log plot of decibels attenuation or insertion loss from arm $\underline{1}$ to arm $\underline{4}$, in the case of the system in FIG. 4, and from arm $\underline{1}$ to arm $\underline{3}$, in the case of the system in FIG. 5 vs. the phase function $n$, as defined above, for each of the systems shown in those figures. The plot consists of a family of curves for different values of $m$ and in addition there are curves of frequency vs. db attenuation for $m=4$ for each of the cascaded systems. The frequency is plotted as frequency units above and below $f_0$, the loop resonant frequency. Each frequency unit is equal to $\Delta f_B$, the bandwidth at 3 db attenuation.

Turning next to FIG. 7 there is shown another form of cascaded loops in which two loops are coupled by a single directional coupler. It can be shown by a rigid analysis of such a structure that the power coupling ratio from arm $\underline{1}$ to arm $\underline{3}$ is expressed by the following:

$$(26) \qquad \left|\frac{b_3}{a_1}\right|^2 = \left[1 + \frac{(\phi_0 - \phi)^4}{(\phi_0 - \phi_B)^4}\right]^{-1}$$

Figure 8:
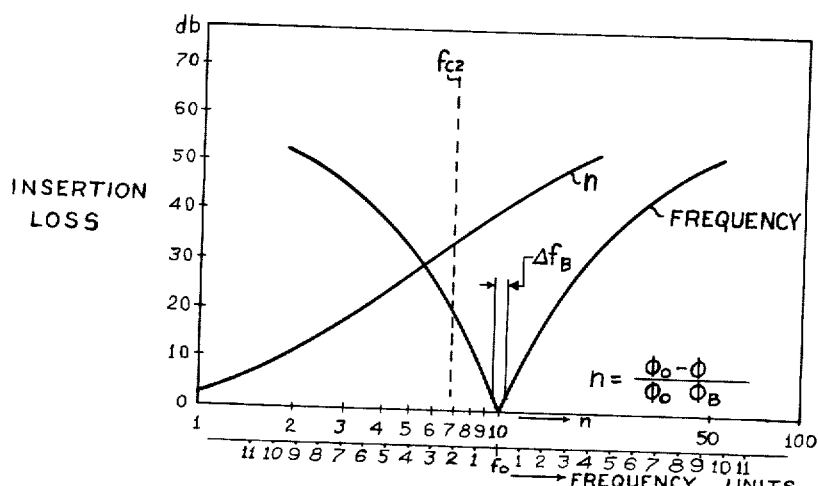
FIG. 8 illustrates a curve of insertion loss versus a function of loop phase for the system shown in FIG. 7.

The above expression for power coupling between arms $\underline{1}$ and $\underline{3}$, presumes that $\theta_1 = \theta_3$ and that $\theta_2$ may or may not be equal to $\theta_1$ and $\theta_3$. A semi-log plot of decibels attenuation vs. $n$, representative of Equation 23, is shown in FIG. 8 and also included therein as a plot of frequency vs. decibels attenuation for the system of FIG. 7. Frequency is plotted as frequency units above and below resonant frequency, $f_0$, and each unit is equal to $\Delta f_B$.

Figure 9:
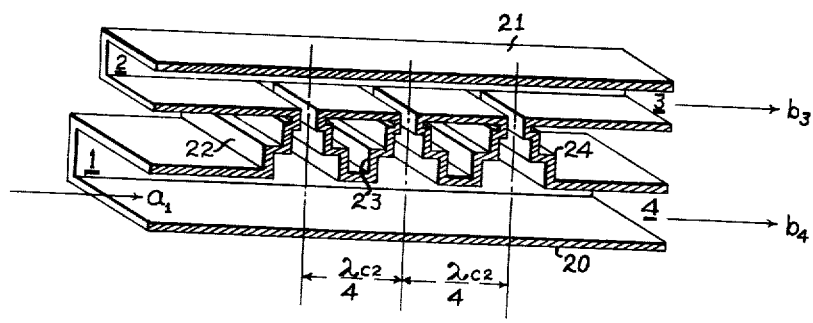
FIG. 9 illustrates a directional coupler having main and auxiliary lines designed for cut off at different frequencies.

Turning next to FIG. 9 there is shown one form of a directional coupler wherein one pair of adjacent coupled arms are designed for cut off at one frequency and the other pair of adjacent coupled arms are designed for cut off at another frequency. For example, arms $\underline{1}$ and $\underline{4}$, formed by a waveguide 20, may be designed for cut off at a frequency $f_{c1}$, whereas arms $\underline{2}$ and $\underline{3}$ formed by waveguide 21 are designed for cut off at higher frequency $f_{c2}$ (wavelength $\lambda_{c2}$). One novel method of coupling waveguide 20 to waveguide 21 might, for example, consist of a plurality of stepped coupling guides such as 22, 23 and 24, each somewhat identical in shape and disposed from each other along waveguides 20 and 21 at approximately one-quarter $\lambda_{c2}$ intervals as shown in FIG. 9. Directional couplers of this type may be employed for coupling harmonics only of a fundamental frequency from waveguide 20 to waveguide 21. In such cases, waveguide 21 would be designed for cut off at a frequency between said fundamental and its first harmonic.

Figures 10A, 10B:
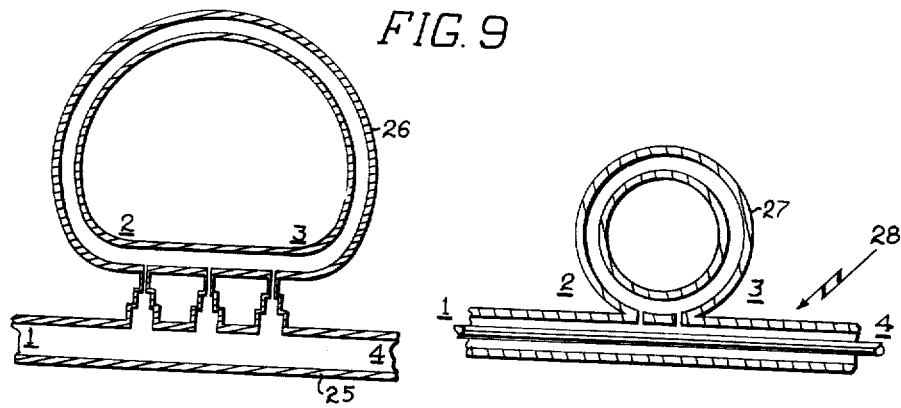
FIGS. 10a and 10b illustrate simple forms of a directional filter employing couplers having arms thereof cut off at different frequencies whereby cut off characteristics contribute to frequency isolation and filtering.
Figure 11:
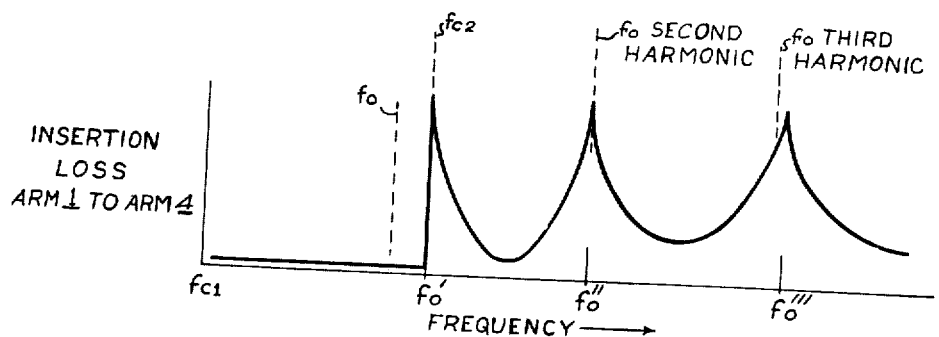
FIG. 11 illustrates a curve of insertion loss versus frequency for a typical directional filter showing the effect of the above-mentioned loop cut off frequency.

Turning next to FIG. 10a there is shown a device employing a coupler such as shown and described with reference to FIG. 9, for coupling signals from waveguide 25 to a waveguide loop 26, the purpose being, for example, to couple at least the first harmonic of a fundamental frequency, $f_0$, in a waveguide 25 to the waveguide loop 26, but not to couple $f_0$ from guide 25 to loop 26. Consequently, the cut off frequency $f_{c2}$, of loop 26 preferably lies between the fundamental frequency $f_0$ and its first harmonic. FIG. 11 is a plot of insertion loss vs. frequency for the device. The insertion loss from arm $\underline{1}$ to arm $\underline{4}$ peaks at resonant frequencies of the loop denoted $f_0'$, $f_0''$, $f_0'''$, etc., thus creating a multitude of narrow frequency bands over which the coupling from arm $\underline{1}$ to arm $\underline{4}$ is a minimum. The fundamental resonant frequency of the loop is below the cut off frequency of waveguide 26 forming the loop and is approximately equal to $f_0$.

The frequency separation between the bands centered at $f_0'$, $f_0''$, $f_0'''$, etc., and the width of these bands increases as frequency increases. Therefore, the frequencies $f_0'$, $f_0''$, $f_0'''$ are not precisely harmonics of the frequency $f_9$ transmitted in waveguide 25. However, the bands centered at these frequencies are sufficiently wide to include harmonics of $f_0$ as shown in FIG. 11.

Waveguide 25 is preferably designed for cut off at a frequency $f_{c1}$, which is considerably below $f_0$ and the fundamental resonant frequency of loop 26, and the waveguide loop 26 is designed for cut off at $f_{c2}$ which falls between $f_0$ and $f_0'$. Consequently, the harmonics of $f_0$ will be coupled from guide 25 to loop 26 and these harmonics will be cancelled in guide 25 while $f_0$ will be unaffected.

The principle described above with reference to FIGS. 10a and 11 may be applied to a similar device shown in FIG. 10b. In FIG. 10b, a waveguide loop 27 is coupled to a coaxial transmission line 28. The method of coupling is the same as already described with reference to FIG. 1d; however, other suitable directional coupling structures having one pair of coaxial adjacent coupled arms and another pair of waveguide adjacent coupled arms may be substituted. In order to remove harmonics of a signal at frequency $f_0$ transmitted in coaxial line 28, the cut off frequency of waveguide loop 27 is preferably between $f_0$ and the first harmonic of $f_0$ and the fundamental resonant frequency of the loop is substantially equal to $f_0$.

The cut off frequency of coaxial transmission line 28 is zero and, therefore, is not the same as the cut off frequency waveguide loop 27. However, FIG. 11 is applicable for showing the characteristics of the device in FIG. 10b requiring only that $f_{c1}$ be moved along the abscissa to the zero frequency.

The techniques described above for designing the loop and main transmission line for cut off at different frequencies can be applied to any of the directional filter devices shown symbolically in FIGS. 2, 3, 4, 5 and 7. For example, in FIG. 3 couplers $\theta_1$ and $\theta_2$ might be designed so that arms $\underline{2}$ and $\underline{3}$, $\underline{1}'$ and $\underline{4}'$ and $\underline{2}'$ and $\underline{3}'$ are all designed for cut off at a higher frequency $(f_{c2})$ than arms $\underline{1}$ and $\underline{4}$. Thus, only harmonics of a fundamental frequency in arms $\underline{1}$ and $\underline{4}$ are coupled into the loop and attenuated or applied to non-reflecting loads coupled to arms $\underline{2}'$ and $\underline{3}'$ and the fundamental is not attenuated. Likewise, in the systems shown in FIGS. 4 and 5, the directional couplers and the loops may be designed so as to couple only harmonics of a fundamental frequency in arms $\underline{1}$ and $\underline{4}$ into the loops for attenuation and cancellation or application to matched loads. For example, in the attenuation curves of FIG. 6, $f_0$ might represent the center frequency of the second harmonic of a fundamental frequency in arms $\underline{1}$ and $\underline{4}$ of the cascaded systems shown in FIGS. 4 and 5, and the broken line in FIG. 6 might represent a suitable $f_{c2}$. In such a case, the waveguide loops are preferably resonant at said fundamental frequency and also cut off to it. It then follows that said loops are resonant to harmonics of the fundamental but are not cut off to such harmonics.

In the system shown in FIG. 7, directional coupler $\theta_1$ might for example, be similar to the coupler shown in FIG. 9 with the loops in FIG. 7 and couplers $\theta_2$ and $\theta_3$ all designed for cut off at a frequency $f_{c2}$ shown by the broken line in FIG. 8.

There is described herein a number of embodiments of the present invention employing directional couplers coupling signals from a main transmission line to a single or cascaded transmission line loops whereby selected frequency bands are attenuated in the main transmission line. Embodiments of the present invention make use of waveguide frequency cut off characteristics to accomplish frequency isolation. These characteristics are employed in novel single loop and cascaded loop directional filters to achieve various desirable effects and may be applied in other similar systems not shown herein without deviating from the spirit or scope of the present invention as set forth in the accompanying claims.

What is claimed is:

1. A directional filter comprising first wave conducting means, second wave conducting means cut off at a different frequency than said first for conducting waves over at least one closed path of given coupling coefficient, and a four-arm directional coupler having first and second pairs of arms coupled to said first and second conducting means respectively, the coefficient of coupling between arms of each pair being substantially equal to said given coupling coefficient whereby selected frequencies conducted in said first conducting means are cancelled.

2. A directional filter comprising first wave conducting means, second wave conducting means cut off at a higher frequency than said first for conducting waves over at least one closed path of given coupling coefficient and a four-arm directional coupler having first and second pairs of arms coupled to said first and second conducting means respectively, the coefficient of coupling between arms of each pair being substantially equal to said given coupling coefficient whereby selected frequencies conducted in said first conducting means are cancelled.

3. A directional filter coupling sections of a transmission line comprising a plurality of waveguide loops each designed for cut off at a different frequency than said transmission line a plurality of directional couplers coupling said loops together, the electrical lengths of said loops being substantially equal to an integral number of wavelengths of given frequency signals in said transmission line and means directionally coupling said loops to said transmission line sections whereby said given frequency signals are cancelled in said transmission line.

4. A directional filter coupling sections of a transmission line comprising a plurality of waveguide loops each designed for cut off at a higher frequency than said transmission line a plurality of directional couplers coupling said loops together thereby cascading said loops, the electrical lengths of said loops being substantially equal to an integral number of wavelengths of given frequency signals in said transmission line, and a plurality of means each directionally coupling different of said loops to different of said transmission line sections whereby said given frequency signals are cancelled in said transmission line.

5. A directional filter coupled to a transmisison line comprising a plurality of waveguide loops each designed for cut off at a higher frequency than said transmission line, the electrical length of each loop being substantially equal to an integral number of wavelengths of different frequency signals in said transmission line, and separate means directionally coupling each of said loops to said transmission line whereby harmonics of each of said different frequency signals are cancelled in said transmission line.

6. A directional filter coupling sections of a transmission line comprising a plurality of waveguide loops each designed for cut off at a higher frequency than said transmission line, the electrical length of each loop being substantially equal to an integral number of wavelengths of a given frequency signal in said transmission line, a plurality of directional couplers coupling said loops together thereby cascading said loops and a single directional coupler coupling each of said transmission line sections to different of said loops whereby harmonics of said given frequency signal are cancelled in said transmission line and transmitted from at least one of said plurality of directional couplers.

7. A directional filter coupled to a transmission line comprising a plurality of waveguide loops each designed for cut off at a higher frequency than said transmission line, the electrical length of each loop being substantially equal to an integral number of wavelengths of a frequency signal in said transmission line, a plurality of pairs of different directional couplers each pair coupled to a different one of said loops, means coupling one coupler of each pair to one coupler of another pair thereby cascading said loops, and means coupling the remaining coupler of one of said pairs to said transmission line.

References Cited in the file of this patent

UNITED STATES PATENTS

| | | |
|---|---|---|
| 2,849,689 | Kock | Aug. 26, 1958 |
| 2,922,123 | Cohn | Jan. 19, 1960 |
| 2,961,619 | Breese | Nov. 22, 1960 |

UNITED STATES PATENT OFFICE
CERTIFICATE OF CORRECTION

Patent No. 3,092,790                         June 4, 1963

Bernard W. Leake et al.

It is hereby certified that error appears in the above numbered patent requiring correction and that the said Letters Patent should read as corrected below.

Column 1, line 38, for "feed", second occurrence, read -- fed --; line 46, for "nicrostrip" read -- microstrip --; column 4, line 25, before "zero", second occurrence, insert -- are --; line 33, for "ssytem" read -- system --; line 55, equation (7), should appear as shown below instead of as in the patent:

$$\cos \theta = e^{-\gamma l} \text{ or } \cos \theta = e^{-\gamma l}[\cos \beta l - j \sin \beta l]$$

column 5, line 31, the equation should appear as shown below instead of as in the patent:

$$\cos \theta_1 = e^{-\gamma l} \cos \theta_2$$

column 6, line 25, for "A19)" read -- (19) --; column 7, line 53, for "divice" read -- device --; column 8, line 20, strike out "the".

Signed and sealed this 14th day of January 1964.

(SEAL)
Attest:

ERNEST W. SWIDER

Attesting Officer

EDWIN L. REYNOLDS
Acting Commissioner
of Patents